United States Patent
Choy et al.

(10) Patent No.: US 8,974,957 B2
(45) Date of Patent: *Mar. 10, 2015

(54) CATHODE ACTIVE MATERIAL PROVIDING IMPROVED EFFICIENCY AND ENERGY DENSITY OF ELECTRODE

(75) Inventors: Sanghoon Choy, Daejeon (KR); Yong Tae Lee, Jeonju-Si (KR); Hong-Kyu Park, Daejeon (KR); Soo Min Park, Daejeon (KR); Hyo-shik Kil, Daejeon (KR); Cheol-Hee Park, Daejeon (KR); Ji Eun Lee, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/124,421
(22) PCT Filed: Oct. 22, 2009
(86) PCT No.: PCT/KR2009/006141
§ 371 (c)(1),
(2), (4) Date: Aug. 9, 2011
(87) PCT Pub. No.: WO2010/047552
PCT Pub. Date: Apr. 29, 2010

(65) Prior Publication Data
US 2011/0287315 A1    Nov. 24, 2011

(30) Foreign Application Priority Data

Oct. 22, 2008  (KR) .................. 10-2008-0103553
Oct. 22, 2008  (KR) .................. 10-2008-0103562
Oct. 22, 2008  (KR) .................. 10-2008-0103569

(51) Int. Cl.
*H01M 4/52*   (2010.01)
*H01M 4/525*  (2010.01)
(Continued)

(52) U.S. Cl.
CPC ........... *H01M 4/5825* (2013.01); *C01B 25/45* (2013.01); *H01M 4/136* (2013.01); *H01M 2006/5094* (2013.01)
USPC ........ 429/211; 429/60; 429/218.1; 252/182.1

(58) Field of Classification Search
USPC ................. 429/60, 218.1, 221; 252/182.1
See application file for complete search history.

(56) References Cited

U.S. PATENT DOCUMENTS 6,632,566 B1    10/2003  Yamada et al.
2005/0123832 A1*  6/2005  Tsukuma et al. ............. 429/224
(Continued)

FOREIGN PATENT DOCUMENTS

CN    1348228 A    5/2002
CN    1633394 A    6/2005
(Continued)

OTHER PUBLICATIONS

Handbook of Chemistry & Physics, 94th Online Edition, Section 12, Property of Solids, pp. 187-204 titled "Phase Diagrams," accessed Aug. 27, 2013, http://www.hbcpnetbase.com/.*
(Continued)

*Primary Examiner* — Ula C. Ruddock
*Assistant Examiner* — Amanda Barrow
(74) *Attorney, Agent, or Firm* — Birch, Stewart, Kolasch & Birch, LLP

(57) ABSTRACT

Provided is a cathode active material having a composition represented by the following Formula I: $LiFe(P_{1-x}O_4)$ (I) wherein a molar fraction (1−x) of phosphorus (P) is in the range of 0.910 to 0.999, to allow operational efficiency of the cathode active material to be leveled to a lower operational efficiency of an anode active material and improve energy density of the cathode active material. Furthermore, a cathode active material, wherein a molar fraction (1−x) of phosphorus (P) is lower than 1, contains both $Fe^{2+}$ and $Fe^{3+}$, thus advantageously preventing structural deformation, improving ionic conductivity, exhibiting superior rate properties and inhibiting IR drop upon charge/discharge, thereby imparting high energy density to batteries.

23 Claims, 3 Drawing Sheets
(1 of 3 Drawing Sheet(s) Filed in Color)

(51) Int. Cl.
*H01M 4/64* (2006.01)
*B82Y 30/00* (2011.01)
*H01M 4/58* (2010.01)
*C01B 25/45* (2006.01)
*H01M 4/136* (2010.01)
*H01M 6/50* (2006.01)

(56) References Cited

U.S. PATENT DOCUMENTS

| | | | |
|---|---|---|---|
| 2005/0271943 A1* | 12/2005 | Park et al. | 429/231.1 |
| 2006/0188782 A1* | 8/2006 | Yamada et al. | 429/231.95 |
| 2006/0204735 A1* | 9/2006 | Naito | 428/210 |
| 2006/0233696 A1 | 10/2006 | Paulsen et al. | |
| 2006/0263286 A1 | 11/2006 | Wu et al. | |
| 2007/0059598 A1* | 3/2007 | Yang | 429/209 |
| 2007/0212606 A1* | 9/2007 | Chang | 429/221 |
| 2007/0292747 A1* | 12/2007 | Chiang et al. | 429/52 |
| 2008/0254368 A1* | 10/2008 | Ooyama et al. | 429/223 |
| 2010/0136433 A1* | 6/2010 | Kim et al. | 429/231.95 |
| 2011/0091772 A1* | 4/2011 | Mishima et al. | 429/221 |

FOREIGN PATENT DOCUMENTS

| | | | | |
|---|---|---|---|---|
| EP | 1 489 672 A1 | 12/2004 | | |
| JP | 2002-15735 A | 1/2002 | | |
| JP | 2004-259470 A | 9/2004 | | |
| JP | 2006-131485 A | 5/2006 | | |
| KR | 10-2008-0077412 A | 8/2008 | | |
| WO | WO 2008/091707 A2 | 7/2006 | | |
| WO | WO 2008/091707 | * 7/2008 | | H01M 4/58 |
| WO | WO 2009/122686 | * 10/2009 | | H01M 4/58 |

OTHER PUBLICATIONS

International Search Report dated Jun. 17, 2010 in International Application No. PCT/KR2009/006141.
Lee, J. et al, "Synthesis of LiFePO4 micro and nanoparticles in supercritical water," Materials Letters, Aug. 2006, vol. 60, issues 17-18, pp. 2105-2109 (abstract only).

* cited by examiner ically relates to a cathode active material having the structure of lithium iron phosphate (LiFe($P_{1-x}O_4$)) wherein a molar fraction (1−x) of phosphorus (P) is in the range of 0.910 to 0.999.

CATHODE ACTIVE MATERIAL PROVIDING IMPROVED EFFICIENCY AND ENERGY DENSITY OF ELECTRODE

This application is a national stage entry of copending PCT International Application No. PCT/KR2009/006141 filed on Oct. 22, 2009 which designated the United States, and on which priority is claimed under 35 U.S.C. §120. This application also claims priority under 35 U.S.C. §119(a) on the following three Patent Applications: Patent Application No. 10-2008-0103553 filed in the Republic of Korea on Oct. 22, 2008; Patent Application No. 10-2008-0103562 filed in the Republic of Korea on Oct. 22, 2008; and Patent Application No. 10-2008-0103569 filed in the Republic of Korea on Oct. 22, 2008. The entire contents of each of the above documents are hereby incorporated by reference into the present application.

TECHNICAL FIELD

The present invention relates to a cathode active material with improved electrode efficiency and energy density. More specifically, the present invention relates to a cathode active material having the structure of lithium iron phosphate (LiFe($P_{1-x}O_4$)) wherein a molar fraction (1−x) of phosphorus (P) is in the range of 0.910 to 0.999.

This cathode active material allows operational efficiency thereof to be leveled to a lower operational efficiency of an anode active material and exhibits improved energy density. Further, a cathode active material, wherein a molar fraction (1−x) of phosphorus (P) is controlled to a level lower than 1, contains $Fe^{2+}$ and $Fe^{3+}$, thus avoiding structural deformation resulting from to the lack of phosphorous (P), exhibiting improved ionic conductivity and thus superior rate properties and inhibiting IR drop upon charge/discharge, thereby providing high energy density.

BACKGROUND ART

Technological development and increased demand for mobile equipment have led to a rapid increase in the demand for secondary batteries as energy sources. Among these secondary batteries, lithium secondary batteries having high energy density and voltage, long lifespan and low self-discharge are commercially available and widely used.

Lithium secondary batteries generally use a carbon material as an anode active material. Also, the use of lithium metals, sulfur compounds and the like as the anode active material has been considered. Meanwhile, the lithium secondary batteries generally use lithium cobalt composite oxide ($LiCoO_2$) as a cathode active material. Also, the use of lithium-manganese composite oxides such as $LiMnO_2$ having a layered crystal structure, $LiMn_2O_4$ having a spinel crystal structure and lithium nickel composite oxide ($LiNiO_2$) as the cathode active material has been considered.

$LiCoO_2$ is currently used owing to superior physical properties such as excellent cycle life, but has disadvantages of low stability, high cost due to use of cobalt, which suffers from natural resource limitations, and limitations of mass-use as a power source for electric automobiles. $LiNiO_2$ is unsuitable for practical application to mass-production at a reasonable cost due to many features associated with preparation thereof. Lithium manganese oxides such as $LiMnO_2$ and $LiMn_2O_4$ have a disadvantage of short cycle life.

In recent years, methods of using lithium transition metal phosphate as a cathode active material have been researched. Lithium transition metal phosphate is largely divided into $Li_xM_2(PO_4)_3$ having a NASICON structure and $LiMPO_4$ having an olivine structure, and is found to exhibit superior high-temperature stability, as compared to conventional $LiCoO_2$. To date, $Li_3V_2(PO_4)_3$ having a NASICON structure is well-known, and $LiFePO_4$ and Li(Mn, Fe)$PO_4$ are the most widely known olivine structure compounds.

Among olivine structure compounds, $LiFePO_4$ has a high output voltage of ~3.5 V and a high theoretical capacity of 170 mAh/g, as compared to lithium (Li), and exhibits superior high-temperature stability, as compared to cobalt (Co), and utilizes cheap Fe, thus being highly applicable as the cathode active material for lithium secondary batteries. However, such an olivine-type $LiFePO_4$ has an operational efficiency of about 100%, thus making it difficult to control the operational efficiency of an anode.

In this regard, by imparting equivalent operational efficiency to a cathode and an anode in batteries, inefficient waste of the electrodes can be minimized. For example, in the case where an anode having efficiency of about 100% is used for a battery, the battery can exert 100% efficiency, while when a cathode having 100% efficiency and an anode having 90% efficiency are used for a battery, the battery can exert only 90% efficiency. As a result, 10% of the efficiency of the cathode is disadvantageously wasted.

For example, in the case of generally-used carbon-based anode active materials, about 10-20% irreversible capacity is generated upon initial charge/discharge including the first charge and its reversible capacity is only about 80 to 90%. Accordingly, when a material having an efficiency of 100% is used as a cathode active material, the electrode material is disadvantageously wasted in direct proportion to the irreversible capacity of about 10 to 20%. In addition, when an anode active material having relatively low efficiency is used, an amount of the anode active material should be increased, depending on a higher efficiency of a cathode, which disadvantageously entails an increase in manufacturing costs.

On the other hand, in order to impart 100% efficiency to a battery using a cathode having 100% efficiency, an anode having about 100% efficiency should be used. In this case, the selection range of an anode active material is disadvantageously narrowed.

However, to date, there is no technology suggesting a method for controlling efficiency of $LiFePO_4$ as a cathode active material.

In addition, there is an increasing need for a breakthrough that can considerably improve electrical conductivity of $LiFePO_4$ and solve Li+ diffusion problems thereof via improvement in initial IR drop and Li+ diffusion properties.

Furthermore, in a case where $LiFePO_4$ is used as a cathode active material, an internal resistance of batteries disadvantageously increases due to low electrical conductivity thereof and a limitation on sufficient increase of energy density due to low density, as compared to common cathode active materials. Further, olivine crystal structures in which lithium is deintercalated are highly unstable, thus disadvantageously entailing blocking of passage of a region, where lithium on crystal surfaces is deintercalated, and delay of lithium intercalation/deintercalation rates.

In response to this, a decrease in size of olivine crystals to a nanometer-scale in order to shorten a movement distance of lithium ions and thus increase discharge capacity has been suggested (see. Japanese Patent Application Publication Nos. 2002-15735 and 2004-259470).

However, fabrication of electrodes using such an olivine particle with a fine diameter inevitably entails use of a large amount of binder, thus disadvantageously lengthening slurry mixing time and deteriorating process efficiency.

Accordingly, there is an increasing need for lithium iron phosphate such as LiFePO$_4$ that exhibits superior electrical conductivity and density as well as process efficiency.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present invention have discovered that control of a molar fraction (1−x) of phosphorus (P) in high-efficiency lithium iron phosphate to the range of 0.910 to 0.999 enables leveling of efficiency of the cathode active material to a lower operational efficiency of an anode active material, minimization in waste of electrode efficiency and thus ultimate maximization of efficiency and capacity of electrodes and batteries, and that controlling Fe valence enables improvement in IR drop and rate properties, improvement in charge/discharge plateau potential and thus maximized increase in energy density.

Further, the inventors of the present invention have discovered that lithium iron phosphate composed of secondary particles with a predetermined porosity, formed by aggregation of primary particles having a small diameter, can satisfy superior electrical conductivity, stable crystal structure and high density, which are advantages of smaller primary particles, as well as high process efficiency, which is an advantage of secondary particles, thus ultimately maximizing capacity and energy density of electrodes and batteries.

Based on these discoveries, the present invention has been completed.

Technical Solution

In accordance with an aspect of the present invention, the above and other objects can be accomplished by the provision of a cathode active material having a composition represented by the following Formula I,

$$\mathrm{LiFe(P_{(1-x)}O_4)} \qquad (I)$$

wherein a molar fraction (1−x) of phosphorus (P) is in the range of 0.910 to 0.999.

The cathode active material having the composition of Formula I enables leveling of operational efficiency of the cathode active material to a lower operational efficiency of an anode active material and exhibits improved energy density by controlling a molar fraction (1−x) of phosphorus (P) within the range of 0.910 to 0.999.

As mentioned above, LiFePO$_4$ has an operational efficiency of about 100%. Accordingly, when an anode active material having relatively low efficiency is used as an anode active material, a variety of electrode materials are required, in order to cause the anode active material to have reversible capacity, comparable to a cathode active material, thus disadvantageously entailing an increase in manufacturing costs.

In this regard, the inventors of the present invention discovered that initial operational efficiency can be relatively reduced by controlling a molar fraction (1−x) of phosphorus (P) within the range of 0.910 to 0.999. In accordance with this discovery, although an anode active material having lower operational efficiency is used, operational efficiency of a cathode active material can be leveled to that of the anode active material.

Accordingly, the present invention enables minimization of electrode material waste and thus considerable decrease in manufacturing costs, and secures desired efficiency and capacity of batteries, thus being highly advantageous in view of manufacturing processes. In addition, advantageously, the present invention solves problems associated with irreversible capacity of anode active materials and widens the range of anode active material that can be used, when taking into consideration battery efficiency.

Furthermore, general LiFePO$_4$ contains only Fe with a valence of 2$^+$, while LiFeP$_{(1-x)}$O$_4$ wherein the molar fraction (1−x) of phosphorus (P) is in the range of 0.910 to 0.999 in accordance with the present invention has a decreased molar fraction of phosphorus (P) and thus contains both Fe$^{2+}$ and Fe$^{3+}$. When a metal present in the structure of an active material has a mixed valence (e.g. Fe$^{2+}$/Fe$^{3+}$), electrical conductivity and Li$^+$ diffusion-associated ionic conductivity are increased and overall rate properties are thus considerably improved, as compared to when the metal has a single valence (Fe$^{2+}$).

The present inventors have discovered that the cathode active material of the present invention inhibits IR drop upon charge/discharge and improves discharge profiles, without causing any structural variation, and thus ultimately increases energy density of batteries.

As used herein, the term "an anode active material having relatively low operational efficiency" refers to a material having operational efficiency lower than the compound of Formula I, as the cathode active material, which includes all anode active materials having lower efficiency and anode active materials having decreased operational efficiency, as compared to cathode active materials due to irreversible capacity generated therein upon initial charge/discharge including the first charge, although they have theoretical capacity comparable to cathode active materials.

The anode active material has an operational efficiency lower than 100%, preferably, of 90 to 98%, more preferably, of 90 to 95%.

For example, such an anode active material is preferably a carbon-based material capable of exerting high discharge capacity.

Any carbon-based material may be used without particular limitation so long as it permits reversible intercalation/deintercalation of lithium ions. The carbon-based material may be a crystalline carbon-based compound, an amorphous carbon-based compound, or a combination thereof. A representative example of the crystalline carbon-based compound is graphite. The graphite-based crystalline carbons include potato- or mesocarbon microbead (MCMB)-shape artificial graphite, natural graphite surface-treated to obtain a flat edge, and the like. In addition, the amorphous carbon-based compound is a material comprising carbon atoms having an amorphous crystal structure and examples thereof include non-graphitizable carbon (hard carbon) prepared by subjecting phenol or furan resins to pyrolysis and graphitizable carbon (soft carbon) prepared by carbonizing coke, needle coke or pitch.

In a preferred embodiment, the carbon material may be natural or artificial graphite which has high capacity and high energy density owing to superior density and conductivity and thus exhibits superior output and rate properties. More preferably, the carbon material may be mesocarbon microbeads (MCMBs) which are optically-anisotropic spherical particles prepared by heating coke, pitch or the like at about 400° C.

In addition, as examples of the cathode active materials that can be used in the present invention, mention may be made of Li$_y$Fe$_2$O$_3$(0≤y≤1), Li$_y$WO$_2$(0≤y≤1), Sn$_x$Me$_{1-x}$Me'$_y$O$_z$ (Me:Mn, Fe, Pb, Ge; Me':Al, B, P, Si, Group I, II and III elements of the Periodic Table, halogens; 0≤x≤1; 1≤y≤3; 1≤z≤8) metal composite oxides; lithium metals; lithium alloys; silicon-based alloys; tin-based alloys; and metal oxides such as SnO, SnO$_2$, PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, Bi$_2$O$_5$ and the like.

In the present invention, the molar fraction of phosphorus (P) is in the range of 0.910 to 0.999, preferably, of 0.955 to 0.995. When the molar fraction of the phosphorus (P) is 1, operational efficiency is close to 100%, and when the molar fraction is less than 0.910, the crystalline structure of LiFeP$_{(1-x)}$O$_4$ is deformed, disadvantageously making it difficult to maintain structural stability.

The operational efficiency of the cathode active material is substantially proportional to the molar fraction of phosphorus (P). Accordingly, the cathode active material according to the present invention wherein the molar fraction of phosphorus (P) is 0.910 to 0.999 can be leveled to operational efficiency of 90 to 99.9%, preferably 95 to 99%.

There are several methods for adjusting the molar fraction of phosphorus (P) to 0.910 to 0.999. For example, an amount of phosphorus (P) precursor added is decreased in the process of preparing LiFePO$_4$ or is controlled by pH regulation in the process of synthesis. In accordance with the former method, when the amount of phosphorus (P) precursor added is decreased during a short-time reaction, a reaction product is produced in the presence of a slight deficiency of phosphorus (P) and the desired range of molar fraction can thus be obtained. In accordance with the latter method, a portion of phosphorus (P) is eluted from a reaction product under a slightly decreased pH, thus securing the desired range of molar fraction.

If necessary, Fe may be partially substituted with at least one selected from the group consisting of Al, Mg, Ni, Co, Mn, Ti, Ga, Cu, V, Nb, Zr, Ce, In, Zn and Y. In this case, stability of crystal structures and electrical conductivity can be advantageously improved. However, in the case where the amount of Fe substituted exceeds 0.5 moles, capacity may be disadvantageously deteriorated.

In a preferred embodiment, the cathode active material of the present invention is composed of secondary particles having a mean particle diameter (D50) of 5 to 100 μm, formed by aggregation of primary particles having a mean particle diameter (D50) of 50 to 550 nm, wherein the primary and secondary particles have a composition represented by Formula I below and the secondary particles have a porosity of 10% or more.

When the secondary particles are formed of primary particles wherein pores are hardly present therebetween, they maintain their shape, thus lengthening the Li$^+$ diffusion distance from the surface of the secondary particles to the center thereof and deteriorating rate properties. In addition, in the case where carbon is coated on such a secondary particle, if desired, it cannot be coated to an inner part of the secondary particle, thus ultimately causing deterioration in electrical conductivity.

The present inventors discovered that when secondary particles having a high porosity are prepared and used for the pressing process to fabricate an electrode, at least a portion thereof may be deformed and thus returned to primary particles, thus causing deterioration in Li$^+$ diffusion capability and electrical conductivity.

That is, in the preferred embodiment of the present invention, the cathode active material takes the form of secondary particles, wherein primary particles are aggregated, and has a high porosity, thus exerting superior electrical conductivity and high density, which are advantages of smaller primary particles, as well as high process efficiency, which is an advantage of secondary particles. More specifically, use of secondary particles in the preparation of an electrode mix enables reduction in amounts of binder and solvent used, shortening of mixing and drying periods. Consequently, capacity and energy density of electrodes and batteries can be maximized.

In the cathode active material, the secondary particles have a porosity of at least 10% and have a porosity of 15 to 40% so that they can be returned to primary particles in the process of pressing electrodes.

When the secondary particles have a porosity less than 15%, refinement of the secondary particles requires application of a pressure higher than that in general cases. On the other hand, when the porosity exceeds 40%, bonding strength between primary particles is low, disadvantageously making handling difficult. Furthermore, more preferably, the secondary particles have a porosity of 20 to 30%, taking into consideration uniform dispersion and process efficiency of primary particles.

The pores present in the secondary particles may be closed- or open-type pores. When taking into consideration easy preparation and uniform dispersion of primary particles, the primary particles preferably have a plurality of small pores. Accordingly, these pores preferably have a size of 10 to 1000 nm, more preferably 200 to 700 nm, when measured using an Hg porosimeter.

Meanwhile, primary particles should be used in a crystalline form in order to form secondary particles, so that they can secure superior electrical conductivity, stable crystal structure and high bulk density, although they are converted from deformed secondary particles in the fabrication of electrodes. That is, the primary particles preferably each independently have an olivine crystal structure.

On the other hand, it is undesirable that secondary particles are prepared by aggregating primary particles and by crystallizing via sintering, since a high pressure should be applied to allow the secondary particles to be returned to the primary particles due to high bonding force between the primary particles, and the secondary particles lose their crystal structure, when deformed. This indicates that improvement in Li$^+$ diffusion and conductivity cannot be realized due to the small diameter.

In addition, to easily return the secondary particles to the primary particles, the secondary particles are preferably formed by aggregating the primary particles via physical bonds such as van der Waals attraction rather than chemical bonds such as covalent or ionic bonds.

The primary particles preferably have a mean particle diameter (D50) of 50 to 550 nm, more preferably 100 to 300 nm, when taking into consideration the facts that when the mean particle diameter of the primary particles is excessively large, ionic conductivity cannot be improved to a desired level and that particles having an excessively small diameter are difficult to prepare.

In addition, when the secondary particles have an excessively large mean particle diameter, porosity therebetween is increased and bulk density is deteriorated, and when the secondary particles have an excessively small mean particle diameter, high process efficiency cannot be obtained. Accordingly, it is preferred that the secondary particles have a mean particle diameter (D50) of 5 to 100 μm. It is preferred that the secondary particles have a mean particle diameter (D50) of 5 to 40 μm in view of slurry mixing and smoothness of electrode surfaces. It is not preferable that the mean particle diameter (D50) is higher than 40 μm, since precipitation occurs upon slurry mixing.

Preferably, the secondary particles have a specific surface area (BET) of 5 to 15 m²/g.

In addition, the shape of the cathode active material is not particularly limited. Preferably, the olivine-type lithium iron phosphate may have a spherical shape in view of bulk density.

In a preferred embodiment, the cathode active material has a bulk density of 0.5 to 1.5 g/mL. When the cathode active material has the bulk density as defined above, surface area in contact with a conductive material is increased, thus enabling formation of a superior conductive network and exhibiting superior electrical conductivity. More specifically, the cathode active material has a bulk density of 0.8 to 1.3 g/mL.

If necessary, in order to improve conductivity, the cathode active material may be coated with at least one from the group consisting of carbon, precious metals and conductive polymers. In particular, in the case where the cathode active material is coated with carbon, conductivity can be advantageously effectively improved without greatly increasing preparation costs and weight.

In another preferred embodiment, the cathode active material contains 0.02 to 5% by weight of $Li_3PO_4$, based on the total weight and does not contain $Li_2CO_3$ or contains $Li_2CO_3$ in an amount less than 0.25%.

The cathode active material comprises an extremely small amount of lithium carbonate, thus decreasing gas generation and exhibiting superior high-temperature and storage stabilities. In addition, the cathode active material comprises $Li_3PO_4$ that has considerably superior electrochemical stability, thermal stability and ionic conductivity, thus advantageously exhibiting excellent rate properties, when used as a cathode active material for lithium secondary batteries. As such, the idea that the incorporation of $Li_3PO_4$ into lithium iron phosphate causes improvement in electrical conductivity thereof is novel.

As mentioned above, $Li_2CO_3$ may be formed by reaction of a carbon material added to improve conductivity with lithium ions, or be an unreacted residual lithium precursor. It is preferred that the content of $Li_2CO_3$ be as little as possible. In particular, the swelling phenomenon may increase when $Li_2CO_3$ is present in an amount not less than 0.25% by weight. Accordingly, the $Li_2CO_3$ is preferably present in an amount less than 0.25% by weight, more preferably, not more than 0.1% by weight.

Meanwhile, $Li_3PO_4$ exhibits considerably excellent electrochemical stability and superior thermal stability. Accordingly, $Li_3PO_4$ can improve high-temperature stability of the cathode active material of Formula I without inducing side-reactions in batteries and deteriorating charge/discharge properties thereof. Furthermore, $Li_3PO_4$ can improve ionic conductivity, thus advantageously compensating for low conductivity of cathode active material and improving rate properties of batteries. When $Li_3PO_4$ is present in an amount exceeding 5% by weight, battery capacity is disadvantageously deteriorated under equivalent specifications. Accordingly, it is required that $Li_3PO_4$ be present in an amount of 0.1 to 5% by weight.

The $Li_3PO_4$ may be separately added or formed in the process of preparing the cathode active material of Formula I by a supercritical hydrothermal method.

The cathode active material of Formula I comprising an appropriate amount of $Li_3PO_4$ and/or $Li_2CO_3$ according to the present invention has a pH of 8.5 to 11.5, more preferably of 10.0 to 11.5.

In a preferred embodiment, the contents of $Li_3PO_4$ and $Li_2CO_3$ may be measured using the following methods.

A first method is x-ray diffraction of an element having Ka of 1.6 to 2 used for confirming the presence of $Li_3PO_4$. The element having Ka of 1.6 to 2 may be cobalt (Co) or iron (Fe).

The $Li_3PO_4$ is characterized in that it is not readily detectable by Cu or Ka X-ray diffraction due to interference. Accordingly, the inventors of the present invention confirmed through various attempts that the use of X-ray diffraction utilizing an element having Ka of 1.6 to 2 enables efficient analysis of the presence of $Li_3PO_4$.

A second method is a method of assaying the contents of $Li_2CO_3$ and/or $Li_3PO_4$ which comprises mixing 10 g of a sample with 100 ml of distilled water, stirring the mixture for 5 to 10 minutes, filtering the reaction mixture, titrating the filtrate with acid and measuring pH of the resulting solution.

In these methods, repeated soaking and decanting may be performed upon samples so that $Li_2CO_3$ or $Li_3PO_4$ present in the samples can be entirely dissolved in distilled water. As a result, the accuracy of the contents can be further improved. At this time, parameters such as total sample addition time are not greatly varied. The acid used for the titration is not particularly limited and is preferably HCl.

It is preferred that most of the $Li_2CO_3$ and $Li_3PO_4$ be present on the surface of cathode active materials. This is because, in the case where $Li_3PO_4$ is present on the surface of particles, the $Li_3PO_4$ can advantageously efficiently improve ionic conductivity, while, in the case where $Li_2CO_3$ is present in cathode active materials, it is difficult to remove the particles. Examples of preparation methods of the primary particles include, but are not particularly limited to, a solid-phase method, coprecipitation, a hydrothermal method and a supercritical hydrothermal method.

In a preferred embodiment, preparation of the cathode active material using a supercritical hydrothermal method is carried out in accordance with the following steps (a) to (c):

(a) primarily mixing raw materials with an alkalinizing agent to precipitate transition metal hydroxide;

(b) secondarily mixing supercritical or subcritical water with the mixture obtained in step (a) to synthesize lithium metal composite oxide and drying the same; and (c) calcining the lithium metal composite oxide.

In step (a), as a lithium precursor, one of the ingredients, $Li_2CO_3$, Li(OH), Li(OH).$H_2O$, $LiNO_3$ or the like may be used. As an iron (Fe) precursor, a bivalent iron-containing compound such as $FeSO_4$, $FeC_2O_4.2H_2O$ or $FeCl_2$ may be used. As a phosphorus (P) precursor, an ammonium salt such as $H_3PO_4$, $NH_4H_2PO_4$, $(NH_4)_2HPO_4$ or $P_2O_5$ may be used.

In addition, the alkalinizing agent may be an alkali metal hydroxide, alkaline earth metal hydroxide or an ammonia compound.

In step (b), the supercritical or subcritical water may have a temperature of 200 to 700° C. under pressure of 180 to 550 bar. In step (c), the calcination temperature may be 600 to 1,200° C.

In addition, lithium metal composite oxide composed of secondary particles may be prepared by drying a mixture consisting of primary particles having a predetermined diameter, a binder and a solvent, followed by aggregation. In the mixture, the primary particles and the binder are present in the mixture in an amount of 5 to 20 wt % and 5 to 20 wt %, respectively, with respect to the weight of the solvent. The porosity of the secondary particles can be controlled by varying the ratio of the primary particles and the solvent. The solvent used in this step may include all organic solvents including polar solvents such as water and non-polar solvents. Examples of the binder used in the step include, but are not limited to, sucrose and lactose-based sugars, PVDF- or PE-based polymers and cokes which are soluble in a polar solvent.

The dying and preparation of the secondary particles may be carried out at the same time by various methods known in the art, including spray drying, fluidized-bed drying, vibration drying, etc. In particular, rotating spray drying is preferred, because it enables preparation of secondary particles in the form of spheres and thus improves tap density.

The drying may be carried out at a temperature of 120 to 200° C. under inert gas (e.g., Ar, $N_2$) atmosphere.

The present invention also provides a cathode mix comprising a cathode active material.

In addition to the cathode active material, the cathode mix may optionally comprise a conductive material, a binder, a filler and the like.

The conductive material is commonly added in an amount of 1 to 50% by weight, based on the total weight of the mixture including the cathode active material. Any conductive material may be used without particular limitation so long as it has suitable conductivity without causing adverse chemical changes in batteries. As examples of the conductive materials that can be used in the present invention, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component which helps binding of an active material to a conductive material and a current collector. The binder is commonly added in an amount of 1 to 50% by weight, based on the total weight of the compound including the anode active material. Examples of the binder include polyvinylidene, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene propylene diene terpolymer (EPDM), sulfonated EPDM, styrene butadiene rubber, fluoro rubber and various copolymers.

The filler is a component optically used to inhibit expansion of the anode. There is no particular limit to the filler, so long as it does not cause adverse chemical changes in the fabricated battery and is a fibrous material. As examples of the filler, there may be used olefin polymers such as polyethylene and polypropylene; and fibrous materials such as glass fibers and carbon fibers.

Also, the present invention provides a cathode for secondary batteries wherein the cathode mix is applied to a current collector.

The cathode for secondary batteries may be prepared by applying a slurry obtained by mixing the cathode mix with a solvent such as NMP to a cathode current collector, followed by drying and press-rolling.

The cathode current collector is generally fabricated to have a thickness of 3 to 500 μm. There is no particular limit to the cathode current collector, so long as it has suitable conductivity without causing adverse chemical changes in the fabricated battery. As examples of the cathode current collector, mention may be made of stainless steel, aluminum, nickel, titanium, sintered carbon, and aluminum or stainless steel surface-treated with carbon, nickel, titanium or silver. If necessary, these current collectors may also be processed to form fine irregularities on the surface thereof so as to enhance adhesive strength to the cathode active materials. In addition, the current collectors may be used in various forms including films, sheets, foils, nets, porous structures, foams and non-woven fabrics.

Also, the present invention provides a lithium secondary battery comprising the cathode, the anode, a separator, and a lithium salt-containing non-aqueous electrolyte. The lithium secondary battery utilizes, as a cathode active material, LiFe$(P_{1-x}O_4)$ wherein a molar fraction $(1-x)$ of phosphorus (P) is in the range of 0.910 to 0.999, thereby leveling operational efficiency of the cathode active material to operational efficiency of an anode active material, and advantageously realizing maximization of battery efficiency and exhibiting superior rate properties and improved energy density due to high electrical conductivity and ionic conductivity.

For example, the anode is prepared by applying an anode mix comprising an anode active material to an anode current collector, followed by drying. The anode mix may comprise the afore-mentioned ingredients, i.e., the conductive material, the binder and the filler.

The anode current collector is generally fabricated to have a thickness of 3 to 500 μm. There is no particular limit to the anode current collector, so long as it has suitable conductivity without causing adverse chemical changes in the fabricated battery. As examples of the anode current collector, mention may be made of copper, stainless steel, aluminum, nickel, titanium, sintered carbon, and copper or stainless steel surface-treated with carbon, nickel, titanium or silver, and aluminum-cadmium alloys. Similar to the cathode current collector, if necessary, these current collectors may also be processed to form fine irregularities on the surface thereof so as to enhance adhesive strength to the anode active materials. In addition, the current collectors may be used in various forms including films, sheets, foils, nets, porous structures, foams and non-woven fabrics.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous organic solvent, solid electrolyte and inorganic solid electrolyte may be utilized.

Examples of non-aqueous organic solvents that can be used in the present invention include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of organic solid electrolytes that can be used in the present invention include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte that can be utilized in the present invention, mention may be made of nitrides, halides and sulfates of lithium such as $Li_3N$, $LiI$, $Li_5NI_2$, $Li_3N$—$LiI$—$LiOH$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The above and other objects, features and other advantages of the present invention will be more clearly understood from the following detailed description taken in conjunction with the accompanying drawings, in which.

BEST MODE

Figure 1:
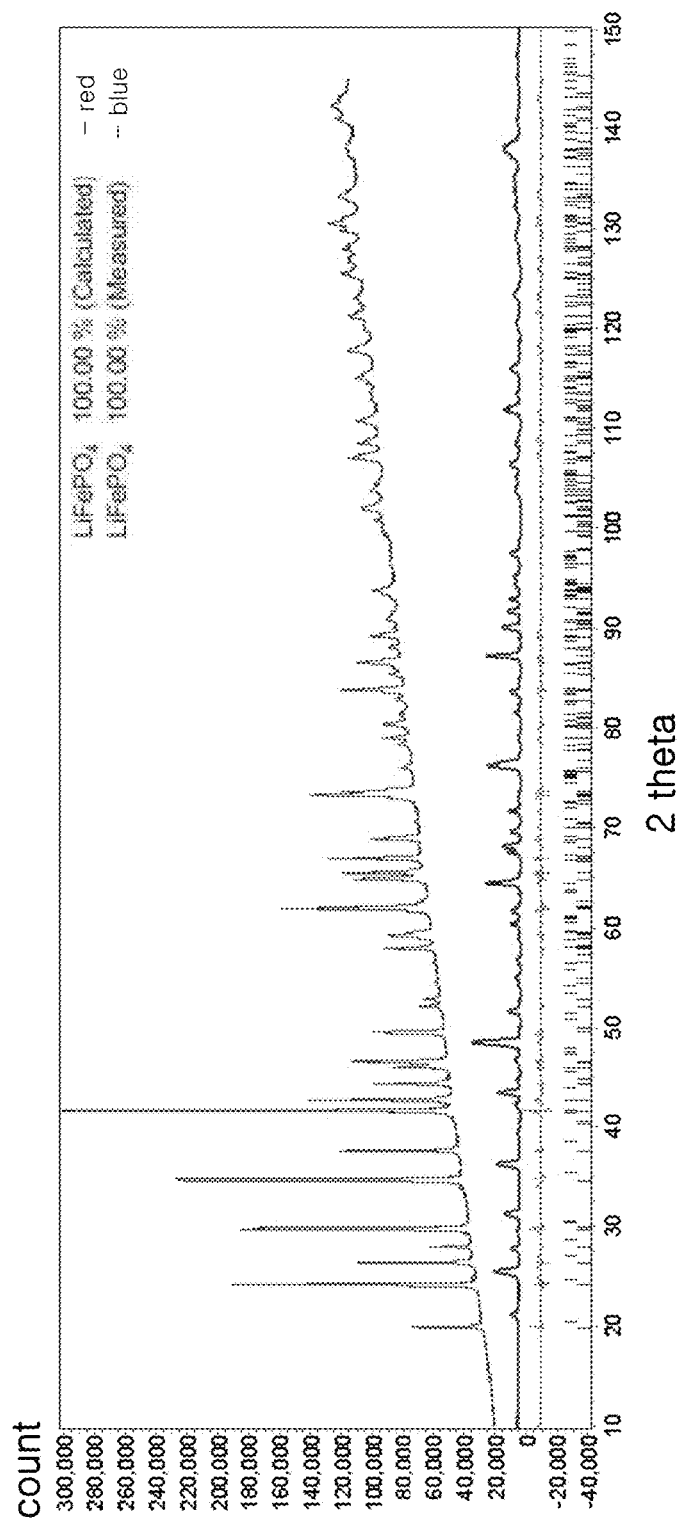
FIG. 1 is a graph showing results of XRD/ND refinement assay in Experimental Example 2.

Now, the present invention will be described in more detail with reference to the following examples. These examples are provided only for illustrating the present invention and should not be construed as limiting the scope and spirit of the present invention.

Preparation Examples 1-4

Cathode active materials ($LiFeP_{1-x}O_4$) wherein the content of phosphorus (P) is 0.94 (Preparation Example 1), 0.96 (Preparation Example 2), 0.97 (Preparation Example 3) and 0.985 (Preparation Example 4) were prepared by a hydrothermal process, well-known as a $LiFePO_4$ preparation method, in accordance with the following process. A more detailed description will be given below.

A solution of lithium hydroxide ($LiOH$—$H_2O$) and iron sulfate ($FeSO_4$·$6H_2O$) as Li and Fe sources in distilled water and phosphoric acid ($H_3PO_4$) as a P source were placed in a reaction chamber. The molar ranges of these materials placed in the reaction chamber were as follows: $FeSO_4$: 0.5 mol, $LiOH$—$H_2O$: 0.5 mol-1.5 mol, $H_3PO_4$: 0.5 mol-0.6 mol.

The reaction was carried out in the reaction chamber at 380° C. for 15 seconds. The reaction pressure was maintained at 270 bar using a pressure controller. When an excess of Li and P compounds are added in hydrothermal reactions generally having a slow reaction rate, impurities were generally readily generated at high temperature under high pressure. Accordingly, in this example, generation of impurities was inhibited by maintaining a rapid reaction rate. The pH of the solution was controlled to 6 by adding a small amount of aqueous ammonia. The $LiFePO_4$ particles thus prepared were washed and then dried under vacuum at 90° C. The dried particles were carbon-coated with sucrose and subjected to thermal treatment at 700° C. for 10 hours.

Example 1

90% by weight of $LiFeP_{0.94}O_4$ prepared in Preparation Example 1, as the cathode active material, 5% by weight of Super-P as a conductive material and 5% by weight of PVdF as a binder were added to N-methyl-2-pyrrolidone (NMP) to prepare a cathode mixture slurry. The cathode mixture slurry was coated on one surface of an aluminum foil, followed by drying and pressing, to fabricate a cathode.

95% by weight of carbon as an anode active material, 1.5% by weight of Super-P as a conductive material and 3.5% by weight of PVdF as a binder were added to NMP as a solvent, to prepare an anode mix slurry. The anode mix slurry was coated on one surface of an aluminum foil, followed by drying and pressing, to fabricate an anode.

An electrode assembly was fabricated by laminating the cathode and the anode using Cellguard™ as a separator and a lithium non-aqueous electrolyte containing 1M $LiPF_6$ in a cyclic and linear carbonate mix solvent was added to the electrode assembly to fabricate a battery.

Example 2

A battery was fabricated in the same manner as in Example 1 except that $LiFeP_{0.96}O_4$ prepared in Preparation Example 2 was used as the cathode active material.

Example 3

A battery was fabricated in the same manner as in Example 1 except that $LiFeP_{0.97}O_4$ prepared in Preparation Example 3 was used as the cathode active material.

Example 4

A battery was fabricated in the same manner as in Example 1 except that $LiFeP_{0.985}O_4$ prepared in Preparation Example 4 was used as the cathode active material.

Comparative Example 1

A battery was fabricated in the same manner as in Example 1 except that $LiFePO_4$ was used as the cathode active material.

Experimental Example 1

Operational efficiency was measured for the batteries prepared in Example 1 and Comparative Example 1 and the results thus obtained are shown in the following Table 1.

TABLE 1

|  | Li:Fe:P | Efficiency |
|---|---|---|
| Ex. 1 | 1:1:0.94 | 95.8% |
| Ex. 2 | 1:1:0.96 | 96.8% |
| Ex. 3 | 1:1:0.97 | 97.6% |
| Ex. 4 | 1:1:0.985 | 99.6% |
| Comp. Ex. 1 | 1:1:1 | 100% |

As can be seen from Table 1 below, charge/discharge efficiency in each cycle can be adjusted to a level lower than 100% by controlling the amount of P present in $LiFePO_4$ to a level lower than 1.

Experimental Example 2

Figure 2:
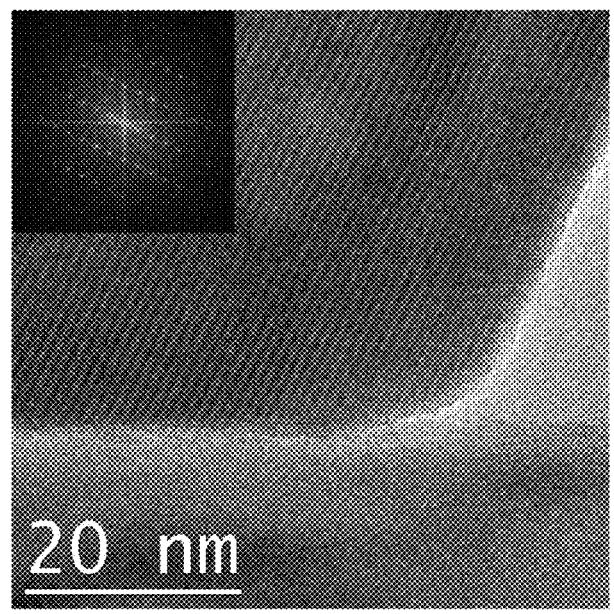
FIG. 2 is an image showing results of HRTEM structural analysis in Experimental Example 2.

The cathode active material obtained in Preparation Example 4 was subjected to XRD and the batteries prepared in Example 4 and Comparative Example 1 were subjected to ND (neutron) refinement assay, HRTEM structural analysis, and Fe valence analysis using Mossbauer effects. The results thus obtained are shown in FIGS. 1 to 3.

As can be seen from the figures, the cathode active material in accordance with the present invention underwent no structural variation and maintained its single crystal olivine structure containing no impurities, although the molar fraction of P is lower than 1.

Figure 4:
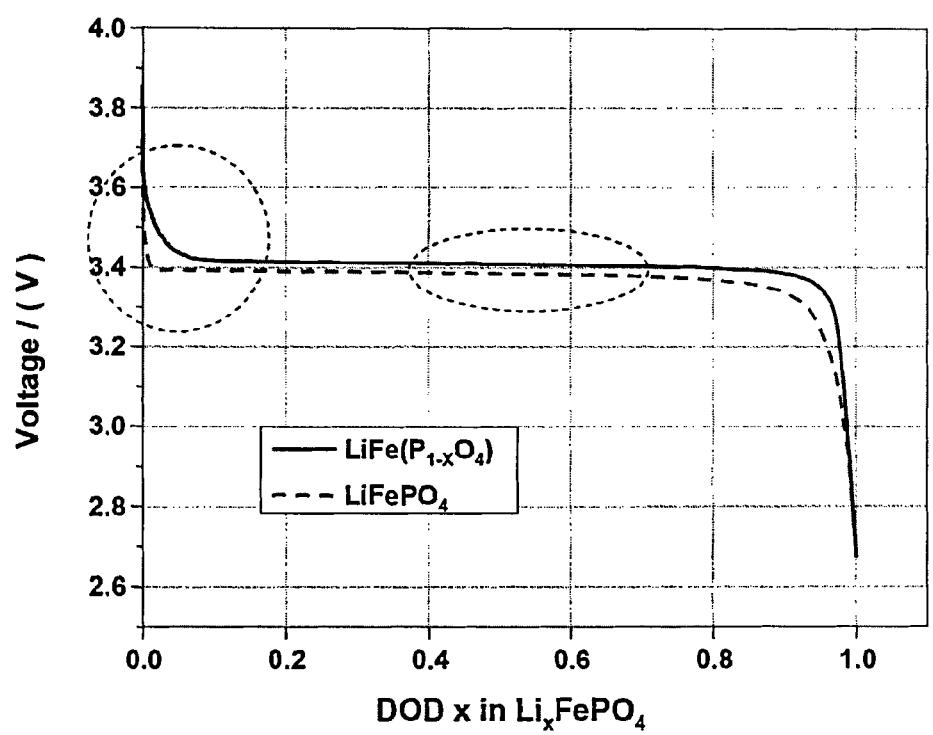
FIG. 4 is a graph showing discharge results in Experimental Example 2.

In addition, variation in voltage upon 0.5 C discharge was measured and the results thus obtained are shown in FIG. 4. As can be seen from FIG. 4, the battery ($LiFe(P_{(1-x)}O_4)$; x=0.015) of the present invention underwent lower initial IR drop and showed discharge profiles at a high voltage, as compared to the battery ($LiFe(PO_4)$) of Comparative Example 1. This indicates considerable improvement in ionic conductivity and electrical conductivity and thus considerable improvement in energy density.

Figure 3:
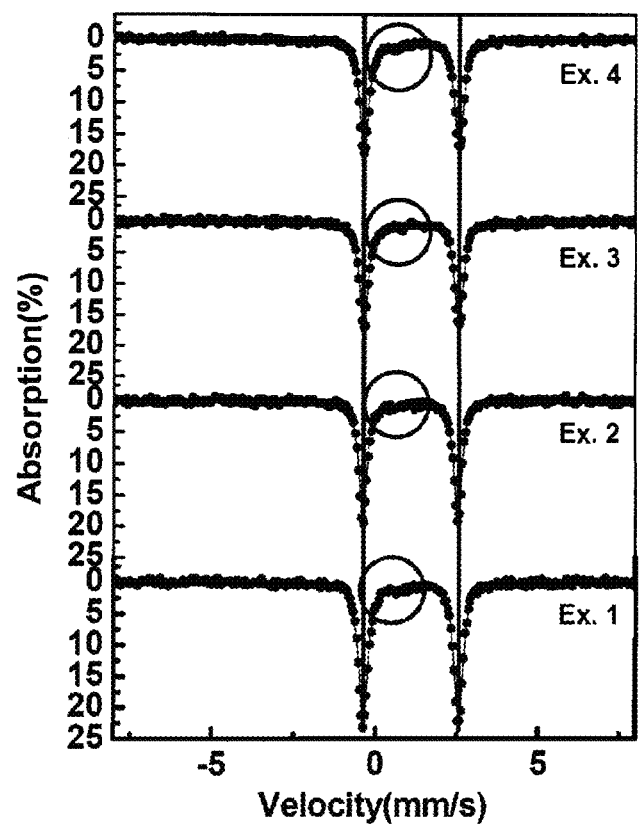
FIG. 3 is a graph showing results of Fe valence analysis using Mossbauer effects in Experimental Example 2.

This behavior is considered to occur because $Fe^{2+}$ and $Fe^{3+}$ coexist in the cathode active material, when taking into consideration that a dominant amount of $Fe^+$ and a small amount of $Fe^{3+}$ were measured in Fe valence analysis using Mossbauer effects, as shown in FIG. 3. In this regard, as apparent from FIGS. 1 and 2, containing no impurities was observed in XRD/ND refinement and HRTEM, which indicates coexistence of $Fe^{2+/3+}$ in the olivine structure.

Experimental Example 3

Primary particles were prepared in Preparation Example 1 and were added together with sucrose to water, followed by stirring to prepare a mixture, and the mixture was aggregated and dried by rotating spray drying to prepare secondary particles having a porosity of 28%. The secondary particles were dried at 120° C. using a spray drier and calcined at 700° C. under a nitrogen atmosphere for 10 hours.

90% by weight of the secondary particles thus prepared, 5% by weight of Super-P as a conductive material and 5% by weight of PVdF as a binder were added to N-methyl-2-pyrrolidone (NMP) to prepare a cathode mixture slurry. The cathode mixture slurry was coated on one surface of an aluminum foil, followed by drying. Then, the cathode mixture slurry was pressed to fabricate a cathode. It was confirmed that the plurality of secondary particles was ground and thus returned to primary particles.

On the other hand, secondary particles in which pores are absent were prepared by coprecipitation. A cathode was fabricated using the secondary particles in the same manner as defined above. It was confirmed that most secondary particles were coated on an aluminum foil in an un-ground state.

Then, an electrode assembly was fabricated by laminating the cathodes and the anodes and interposing Cellguard™ as a separator therebetween, and a lithium non-aqueous electrolyte containing 1M $LiPF_6$ in a cyclic and linear carbonate mix solvent was added to the electrode assembly to fabricate a battery.

The current rate of batteries was changed to 0.1 C, 0.5 C, 1.0 C, 2.0 C and 5.0 C and discharge rate properties thereof were measured. It was confirmed that the batteries of the present invention, in which secondary particles were returned to primary particles in the battery fabrication process, exhibited overall high discharge capacity (in particular, capacity difference of about 50% at a high rate discharge of 5.0 C), as compared to batteries in which secondary particles remained.

Experimental Example 4

10 g of the cathode active material prepared in Preparation Example was stirred in 100 ml of distilled water for 5 minutes, followed by filtration. Then, a 0.1M HCl solution was added to the resulting filtrate, the mixture was subjected to pH titration with stirring and pH was recorded as a function of time. This experiment was performed until the pH reached 3 or lower, and flow rate was suitably determined so that titration took about 20 to 30 minutes. The content of water-soluble base was calculated based on the amount of acid used, until pH reached 5 or lower and the water-soluble base was characterized by pH profiles.

The results ascertained that initial pH was about 11, the amount of $Li_3PO_4$ was about 0.2% by weight and extremely small amounts of $Li_2PO_3$ were present.

A battery was fabricated using the cathode active material in the same manner as in Example 1. On the other hand, a battery was fabricated using a cathode active material containing about 0.27% of $Li_2PO_3$ in the same manner as in Example 1. The capacity maintenance with an increase in C-rate, discharge capacity with an increase in cycles and high-temperature storage properties were tested for these batteries. The high-temperature storage properties were measured by maintaining fully charged batteries in a high-temperature chamber at 90° C. for 4 hours and measuring thickness variation of the batteries at room temperature.

As a result, the batteries of the present invention exhibited considerably superior properties (in particular, high maintenance of about 40% or higher at high-rate discharge of 5 C and small variation in thickness of about 30% or higher) in respective tests.

INDUSTRIAL APPLICABILITY

As apparent from the above description, in accordance with the present invention, a molar fraction (1−x) of phosphorus (P) in $LiFePO_4$, as a high-efficiency cathode active material, is controlled to the range of 0.910 to 0.999, thereby allowing operational efficiency of the cathode active material to be leveled to operational efficiency of an anode active material, maximizing operational efficiency of batteries, minimizing electrode waste and thus reducing manufacturing costs of batteries. In addition, controlling Fe valence leads to improvement in IR drop and rate properties as well as charge/discharge plateau potential, thus realizing fabrication of superior batteries with increased energy density.

Further, the cathode active material according to the present invention is composed of high porosity secondary particles, thus being easy to handle and exhibiting process efficiency, when used as an electrode active material for fabrication of an electrode. Furthermore, primary particles are present in fabricated batteries, thus exhibiting high electrical conductivity and bulk density and imparting improved capacity and rate properties to the batteries.

Further, the cathode active material according to the present invention comprises an appropriate amount of $Li_3PO_4$ and an extremely small amount of $Li_2CO_3$, thus advantageously imparting high-temperature storage stability as well as improving stability and rate properties to lithium secondary batteries, when used as a cathode active material for the lithium secondary batteries.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material being entirely homogenous and having a composition represented by the following Formula I:

$$LiFe(P_{(1-x)}O_4) \qquad (I)$$

wherein a molar fraction (1−x) of phosphorus (P) is in the range of 0.910 to 0.999, and wherein the cathode active material comprises secondary particles with a mean particle diameter (D50) of 5 to 100 μm, said secondary particles are formed by aggregation of primary particles with a mean particle diameter (D50) of 50 to 550 nm, wherein the primary and secondary particles comprise the composition represented by Formula I, respectively, and the secondary particles have a porosity of 10% or more.

2. The cathode active material according to claim 1, wherein the molar fraction of phosphorus (P) is in the range of 0.955 to 0.995.

3. The cathode active material according to claim 1, wherein Fe in Formula I is partially substituted with at least one selected from the group consisting of Al, Mg, Ni, Co, Mn, Ti, Ga, Cu, V, Nb, Zr, Ce, In, Zn and Y.

4. The cathode active material according to claim 1, wherein the porosity is 15 to 40%.

5. The cathode active material according to claim 1, wherein the primary particles are aggregated via a physical bond to form the secondary particles.

6. The cathode active material according to claim 1, wherein the size of pores present in the secondary particles is 10 to 1,000 nm.

7. The cathode active material according to claim 1, wherein the primary particles have a mean particle diameter (D50) of 100 to 300 nm and the secondary particles have a mean particle diameter (D50) of 5 to 40 μm.

8. The cathode active material according to claim 1, wherein the secondary particles have a spherical shape.

9. The cathode active material according to claim 1, wherein the secondary particles have a specific surface area (BET) of 5 to 15 $m^2/g$.

10. The cathode active material according to claim 1, wherein the cathode active material has a bulk density of 0.5 to 1.5 g/mL.

11. The cathode active material according to claim 10, wherein the cathode active material has a bulk density of 0.8 to 1.3 g/mL.

12. The cathode active material according to claim 1, wherein the cathode active material comprises 0.02 to 5% by weight of $Li_3PO_4$, and does not comprise $Li_2CO_3$ or comprises $Li_2CO_3$ in an amount less than 0.25%.

13. The cathode active material according to claim 12, wherein the $Li_3PO_4$ is present in an amount of 0.1 to 5% by weight.

14. The cathode active material according to claim 12, wherein the $Li_2CO_3$ is present in an amount of 0.1% by weight or less.

15. The cathode active material according to claim 12, wherein the cathode active material has a pH of 8.5 to 11.5.

16. The cathode active material according to claim 12, wherein the cathode active material has a pH of 10.0 to 11.5.

17. The cathode active material according to claim 12, wherein the $Li_2CO_3$ or $Li_3PO_4$ is present on the surface of the particles.

18. The cathode active material according to claim 1, wherein the cathode active material is prepared by a supercritical hydrothermal method.

19. A cathode mix comprising the cathode active material according to claim 1.

20. A cathode for secondary batteries, to which the cathode mix according to claim 19 is applied on a current collector.

21. A lithium secondary battery comprising the cathode according to claim 20.

22. The cathode active material according to claim 1, wherein the porosity is 20 to 30%.

23. The cathode mix according to claim 19, further comprising a conductive material and a binder.

* * * * *